(No Model.)
G. W. TAFT.
POLE ATTACHING AXLE PLATE FOR WHEELED SCRAPERS, AGRICULTURAL MACHINES, AND SIMILAR PURPOSES.
No. 382,015. Patented May 1, 1888.
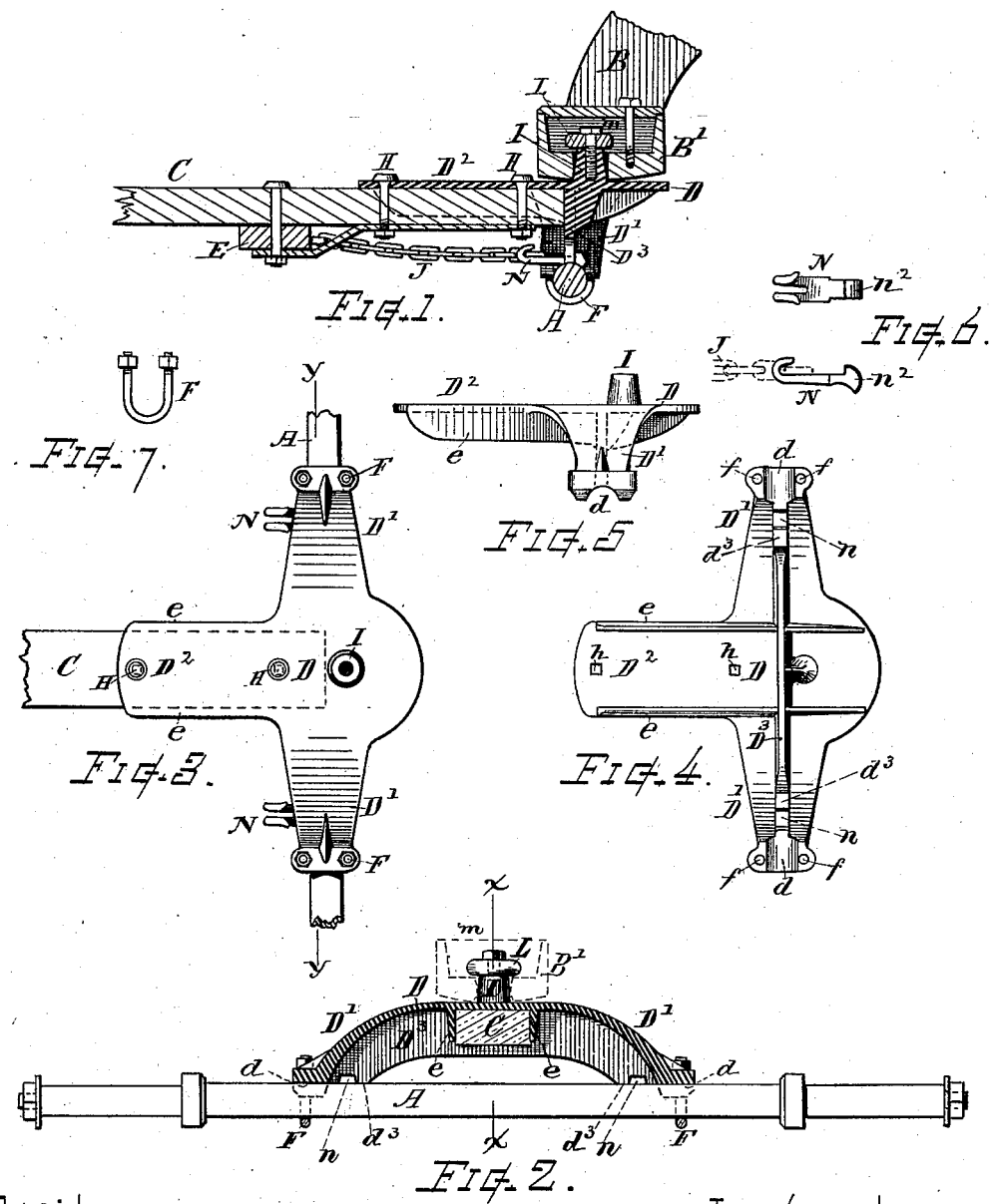
Witnesses,
Simon E. King
Ella P. Blinus
Inventor,
George W. Taft
By Chas. H. Burleigh
Attorney.

UNITED STATES PATENT OFFICE.

GEORGE WARNER TAFT, OF KENNETT SQUARE, PENNSYLVANIA.

POLE-ATTACHING AXLE-PLATE FOR WHEELED SCRAPERS, AGRICULTURAL MACHINES, AND SIMILAR PURPOSES.

SPECIFICATION forming part of Letters Patent No. 382,015, dated May 1, 1888.

Application filed February 4, 1888. Serial No. 263,009. (No model.)

*To all whom it may concern:*

Be it known that I, GEORGE WARNER TAFT, a citizen of the United States, residing at Kennett Square, in the county of Chester and State of Pennsylvania, have invented certain new and useful Improvements in Pole-Attaching Axle-Plates for Wheeled Scrapers, Agricultural Machines, and Similar Purposes, of which the following, together with the accompanying drawings, is a specification sufficiently full, clear, and exact to enable persons skilled in the art to which this invention appertains to make and use the same.

The objects of my present invention are to provide a pole-attaching casting or metal axle-plate of peculiar construction and having convenient facilities for connecting it with the axle, for swiveling the body thereon, and for attaching the pole in a practical and efficient manner. Also, to afford facilities for the attachment of the stay-chains, as hereinafter set forth. Also, to provide an axle-plate or casting having an upwardly-projecting boss that serves as a pivot for the front coupling of the body, and means for retaining the same in connection therewith, as hereinafter explained. These objects I attain by the pole-attaching axle-plate constructed as shown in the accompanying drawings herein described.

Figure 1 is a vertical central section showing my improved axle-plate in connection with the axle, pole, and body-supporter as used in wheeled scrapers and agricultural machines with similar draft apparatus and with an iron front-axle. Fig. 2 is a vertical transverse section of my axle-plate, shown in connection with the axle. Fig. 3 is a top view of my axle-plate with portions of the pole and axle shown in connection therewith. Fig. 4 is a bottom view of the axle-plate separate from other parts. Fig. 5 is a side view of the same. Fig. 6 shows a plan and a side view of the stay-chain hook, and Fig. 7 is a side view of the attaching-loop for bolting the axle-plate to the axle.

Referring to parts, A denotes the axle, which is of metal, and may be cylindrical, square, or other shape, as desired.

B denotes the fore end of the carriage or body or the goose-neck by which the body is swiveled and carried in connection with the front running-gear.

C indicates the pole or draft tongue, and D the metal axle-plate, which forms the essential feature of my invention. This axle-plate D is made preferably of cast metal, iron, or steel, and substantially in the form shown, with strong right and left laterally-projecting downwardly-curved arms D', the ends of which have recesses or seats $d$ for matching the axle-bar A, and with a forwardly-extended portion, $D^2$, which is furnished with side flanges, $e$, between which the rear end of the pole C is inserted, said plate and flanges embracing the pole in the manner illustrated. Holes $f\,f$ are provided in suitable ears on the parts D' for the loops or attaching-bolts F, which bind the axle-bar A firmly to the seats $d$ when the nuts are turned down on their screw-threaded ends. Holes $h\,h$ are formed in the part $D^2$ for the attaching-bolts H, that confine the pole C in place.

Upon the top of the plate D there is formed an upwardly-projecting boss, I, that serves as a coupling-pivot, upon which the fore end or rocker of the body is swiveled. Said boss extends up into the rocker or coupling-box B' in the manner illustrated, and a projecting head or washer, L, attached to the upper end of said boss by a screw-bolt, $m$, serves for confining the coupling in place and prevents it from lifting from the pivot-boss.

A depending web or flange, $D^3$, is formed across the under side of the plate D and its arms D', extending longitudinally with the axle-bar. The ends $d^3$ of said flange abut against the top surface of the axle-bar, and recesses $n$ are formed in the lower edge thereof, within which recesses are secured the grab-hooks N (see Fig. 6) for holding the stay-chains J, that attach the arms of the evener-beam E to the axle. The hooks N are formed with a head, $n^2$, and they are confined securely in the recesses $n$, when the plate is secured to the axle, by the flange embracing the neck of the hook, with the head at the rear of the flange $D^3$, and are thus held in place without other fastening than those that attach the axle-plate. The hooks N are formed with bifurcated hooked ends fitted to embrace a link of the chains J, so that said chains can be hitched onto them at any desired link. The chains can be shortened or lengthened, as required, by simply locking any part of the chain onto the hook.

The axle-plate or pole-attaching casting D, constructed as herein shown and described, affords a very simple, convenient, and efficient means of attachment for connecting the pole and axle and for swiveling the body-coupling without the necessity of a king-bolt; and such axle-plate can be used to practical advantage in the construction of road-machines or wheeled scrapers and in agricultural machines, such as ditchers, gang-plows, or other apparatus having a body mounted on wheels and connected with a front axle or traveling gear of equivalent nature and having a draft-pole attached thereto.

Another important advantage of the invention is that it affords an efficient construction with few parts and one that can be conveniently "knocked down" for shipment and reassembled with facility.

What I claim as of my invention, and desire to secure by Letters Patent, is—

1. The metal axle-plate D, having lateral arms D', provided with seats $d$ for the axle-bar, a projecting pivoting-boss, I, to receive the body-coupling, and a forwardly-projecting portion, $D^2$, having a seat for receiving and supporting the pole formed integral, substantially as set forth.

2. The combination, with the axle A and pole C, of the metal axle-plate D, having the lateral arms D', with seats $d$ for the axle at the ends of said arms, the forwardly-extending portion $D^2$, provided with flanges $e$ for supporting the pole, and the attaching-bolts F and H, substantially as set forth.

3. The pole-attaching axle-plate provided with recesses $n$, in combination with the axle-bar A and stay-chain hooks N, confined in said recesses, substantially as and for the purpose set forth.

4. The axle-plate having the lateral arms D', forward extension $D^2$, and projecting pivot-boss I, provided with the washer L, detachably secured to the top of said boss, in combination with the axle A, pole C, and body-coupling B', having an opening to fit over said boss, substantially as and for the purposes set forth.

5. The stay-chain hook N, having the bifurcated end for engaging a link of the stay-chain and the head $n^2$ at its opposite end, in combination with an axle, A, and axle-plate D, having the recess $n$ for embracing said hook to confine it in position when said plate is attached to the axle, substantially as set forth.

Witness my hand this 26th day of January, A. D. 1888.

GEORGE WARNER TAFT.

Witnesses:
S. JONES PHILIPS,
W. E. VOORHEES.